(12) United States Patent
McGregor et al.

(10) Patent No.: US 6,295,790 B1
(45) Date of Patent: Oct. 2, 2001

(54) COMPACT BAG FILLING MACHINE

(75) Inventors: James R. McGregor, Lakeville; Kurt Bernard Snaza, Owatonna; LaVerne N. Wobschall, Owatonna; Scott Mitchell Anderson, Owatonna; Tracy J. Steiger, Owatonna; Thomas Morness, Owatonna, all of MN (US)

(73) Assignee: Slidell, Inc., Owatonna, MN (US)

( * ) Notice: Subject to any disclaimer, the term of this patent is extended or adjusted under 35 U.S.C. 154(b) by 0 days.

(21) Appl. No.: 09/251,603

(22) Filed: Feb. 17, 1999

(51) Int. Cl.[7] .................................................... B65B 51/14
(52) U.S. Cl. ........................... 53/374.3; 53/571; 53/374.9
(58) Field of Search ................................. 53/284.7, 374.3, 53/374.5, 374.7, 374.6, 374.9, 571, 482; 141/251, 263

(56) References Cited

U.S. PATENT DOCUMENTS

| | | | |
|---|---|---|---|
| 1,889,193 | * 11/1932 | Craig | 53/482 |
| 2,310,382 | * 2/1943 | Allen | 53/482 |
| 2,608,333 | * 8/1952 | Marziani | 53/374.9 |
| 2,766,782 | * 10/1956 | Bell et al. | 141/263 |
| 3,063,890 | * 11/1962 | Saumsiegle | 53/374.9 |
| 3,326,097 | * 6/1967 | Lokey | 53/482 |
| 3,488,915 | * 1/1970 | Delestatius | 53/284.7 |
| 3,889,449 | 6/1975 | Membrino . | |
| 4,019,305 | * 4/1977 | McGhie et al. | 53/482 |
| 4,185,669 | * 1/1980 | Jevakohoff | 141/263 |
| 4,265,696 | * 5/1981 | Graves et al. | 53/479 |
| 4,322,932 | 4/1982 | McGregor . | |
| 4,432,186 | 2/1984 | McGregor . | |
| 4,510,736 | * 4/1985 | Muller | 53/284.7 |
| 4,526,214 | 7/1985 | McGregor . | |
| 4,612,965 | 9/1986 | McGregor . | |
| 4,884,389 | 12/1989 | McGregor . | |
| 5,109,894 | 5/1992 | McGregor . | |
| 5,349,996 | 9/1994 | McGregor . | |
| 5,448,879 | * 9/1995 | Concetti | 53/284.7 |
| 5,535,792 | 7/1996 | McGregor . | |
| 5,768,863 | 6/1998 | McGregor . | |
| 5,771,667 | 6/1998 | McGregor et al. . | |

* cited by examiner

*Primary Examiner*—John Sipos
(74) *Attorney, Agent, or Firm*—Moore & Hansen

(57) ABSTRACT

An integrated and compact bag filling machine comprising a material dispensing spout, a slip tube suspended in substantially vertical alignment with the spout, and a bag sealing apparatus comprising a pair of opposable forming bars and a pair of independently actuable and opposable sealing bars is herein disclosed. The bag filling machine is capable of bottom filling and sealing both paper and plastic bags having gusseted or flat sides with little or no modification.

15 Claims, 6 Drawing Sheets

COMPACT BAG FILLING MACHINE

BACKGROUND OF THE INVENTION

This invention relates to fully automated bag handling and filling machines which pick up bags one at a time from a supply source, fill the bags, and release them in an integrated, high speed, and efficient system. More particularly, this invention is drawn to an apparatus for bottom filling bags used in combination with a bag sealing apparatus that is capable of closing and handling both paper and plastic type bags within a fully automated bag handling and filling machine.

Automated bag handling and filling machines are known in the art See, for example, U.S. Pat. Nos. 4,322,932, 4,432,186, and 4,612,965 issued to Harold R. McGregor. Traditionally, bag handling and filling machines have utilized bag holding clamps on a clam shell type of filling spout to hold the bag during a filling operation on the spout, with the filled bag then being conveyed to a separate, closing machine for closing the bag top, as by stitching or by heat sealing. Bag control and forming bars have been incorporated to grip the bag mouth, after filling, and to lower it onto a conveyor, which serves to transport the filled bag to a separate, bag closing station. Such bag handling and control bars are shown, for example, in U.S. Pat. No. 4,322,932. Recognizing that operating efficiencies including more compact machine footprints and reduced operational costs could be realized by incorporating the bag sealing function within a single machine for handling, filling, and sealing bags, such integrated machines have been developed. For an example of such an integrated machine see U.S. Pat. No. 5,771,667 issued to Harold R. McGregor.

However, bag sealing apparatuses for such integrated bag handling and filling machines have been limited in the manner in which bags could be filled and to closing only plastic bags. Consequently, a bottom filling apparatus for filling bags from the bottom up and a bag sealing apparatus capable of handling and closing both plastic bags and paper bags have been developed.

OBJECTS OF THE INVENTION

A first objective of this invention is to provide a filling mechanism that allows a bag to be filled from the bottom up. Another objective of this invention is to provide a bag sealing apparatus which is capable of handling and closing both plastic and paper bags. Yet another objective of this invention is to provide an integrated bag filling machine which is capable of both filling, sealing, and handling bags and which occupies a minimum of space on a factory floor. A further objective of this invention is to provide a bag closing apparatus capable of handling and closing both plastic and paper bags and which may be mounted in a number of ways, including on a vertically moveable carriage or from an overhead support structure.

BRIEF SUMMARY OF THE INVENTION

The present invention overcomes the problems of the prior art by utilizing a tube-type of bottom filling device in combination with a bag sealing apparatus locate within the same lateral confines as the filling device and bag hanging spout. The bag sealing apparatus is preferably mounted on a vertically moveable carriage positioned in substantial vertical alignment with the filling device. The tube-type of bag filling device may comprise either a slip tube or a vertical auger contained within a fill tube.

The bag sealing apparatus of the present invention comprises a pair of opposable forming bars and a pair of independently actuable and opposable sealing bars which are disposed between a pair of parallel mounting plates in such a manner that the forming bars clamp the top of a filled bag below said sealing bars.

The forming bars are essentially an apparatus for clamping and holding a bag that is to be sealed. In order improve the grasping capabilities of the forming bars, the respective bars may be provided with complementary contoured faces that are arranged and constructed to securely clamp the top of a filled bag therebetween. One such face structure includes arranging the complementary contoured faces of the clamping or forming bars in a tongue-in-groove pattern. Furthermore, in order to ensure the secure clamping of a bag between the forming bars of the present invention, the forming bars are constrained to pivot between the mounting plates in symmetrical opposition with one another.

To close and seal the tops of paper bags, a first of the sealing bars of the bag sealing apparatus may include a bag folding arm for folding a bag top over into contact with a side of the bag being sealed. The bag folding arm or fold-over arm is pivotally mounted to one of the sealing bars. The fold over arm works in conjunction with a bag crimping structure arranged and constructed to form a crimp in the top of said filled bag so as to bias the top of said filled bag in a desired fold direction. The bag crimping structure of the bag sealing apparatus comprises respective forming surfaces formed in the opposable faces of the sealing bars. The forming surfaces of the sealing bars are arranged to clamp a bag top therebetween and form a crimp in the bag top to bias the top of the bag in a desired fold direction.

In addition, one of the sealing bars preferably has secured thereto a backing mechanism which may be a simple plate arranged to oppose the compressive forces exerted by the fold-over arm mounted on the sealing bar. The compressive forces exerted between the compression plate of the backing mechanism and the fold over arm folds the top of a bag over into contact with the side of the bag and permits the heat sensitive adhesive to seal the bag top closed. The preferred embodiment of the backing mechanism comprises a plurality of compression rollers arranged to be reciprocated laterally with respect to the fold over arm when the fold over arm has been actuated to fold the bag top over into contact with the bag side.

It may also be desirable to provide a heating element on the forming surfaces of the sealing bars to heat the bag top at the point of contact between the forming surfaces and the bag top. This application of heat to the bag top is intended to seal a plastic bag or the plastic liner of a paper bag. In addition, the forming or clamping bars may be provided with heating elements that also allow the forming bars to seal a plastic bag or the plastic liner of a paper bag.

The preferred manner of sealing a paper bag top closed is to utilize a heat sensitive adhesive. Therefore, a heating element is preferably secured to one of the sealing bars so as to activate the heat sensitive adhesive applied to a bag side. The folding arm secured to one of the sealing bars may then fold the bag top into contact with the side wall of the bag so as to seal the bag top with the activated heat sensitive adhesive.

The bag sealing apparatus of the present invention is intended to be used in conjunction with a bag filling machine and therefore it is preferable that the mounting plates between which the sealing bars and the forming or clamping bars are disposed be vertically movable between a first inoperative position, and a second, operative position in which the sealing bars and the forming or clamping bars may engage the top of a filled bag. Alternatively, it is possible to alter the structure of the bag sealing apparatus so that it may be laterally moveable between its first and second positions, as opposed to the preferred vertical movement.

The above described bag sealing apparatus is preferably used in conjunction with a bag filling mechanism that comprises a material dispensing spout having clamping members thereon for maintaining a bag on the spout, and a slip tube suspended in substantially vertical alignment with the spout.

The material dispensing spout has a discharge end defined by closure members that are operable between closed and open positions for discharging particulate material into a bag and has a power actuator arranged to open and close the spout discharge end closure members. Clamping members on the spout discharge end are movable between a closed position in which the members are in clamping engagement with the mouth of a bag that is placed on the spout discharge end and an open position in which the members may release or receive a bag mouth from the spout discharge end. The slip tube is suspended in substantially vertical alignment with the spout and is vertically moveable between a first, bag filling position in which the slip tube extends through the spout discharge end and into a bag to be filled when the spout is open and a second, inoperative position in which the slip tube is retracted vertically and the spout is closed. The bag sealing apparatus described above is movable in a travel path between a first, bag receiving position in close proximity to the spout discharge end and a second, bag discharge position away from the spout. It is specifically intended that the travel path of the bag sealing apparatus not be limited to vertical movement only.

In order to facilitate the settling of the material with which a bag is filled, a nozzle may be provided within the slip tube. The nozzle is connected to a vacuum pump for evacuating air from the headspace of the bag being filled. The air in the headspace of the bag is preferably removed immediately prior to the closing of the material dispensing spout.

These and other objectives and advantages of the invention will appear more fully from the following description, made in conjunction with the accompanying drawings wherein like reference characters refer to the same or similar parts throughout the several views.

DETAILED DESCRIPTION OF THE INVENTION

Figure 1:
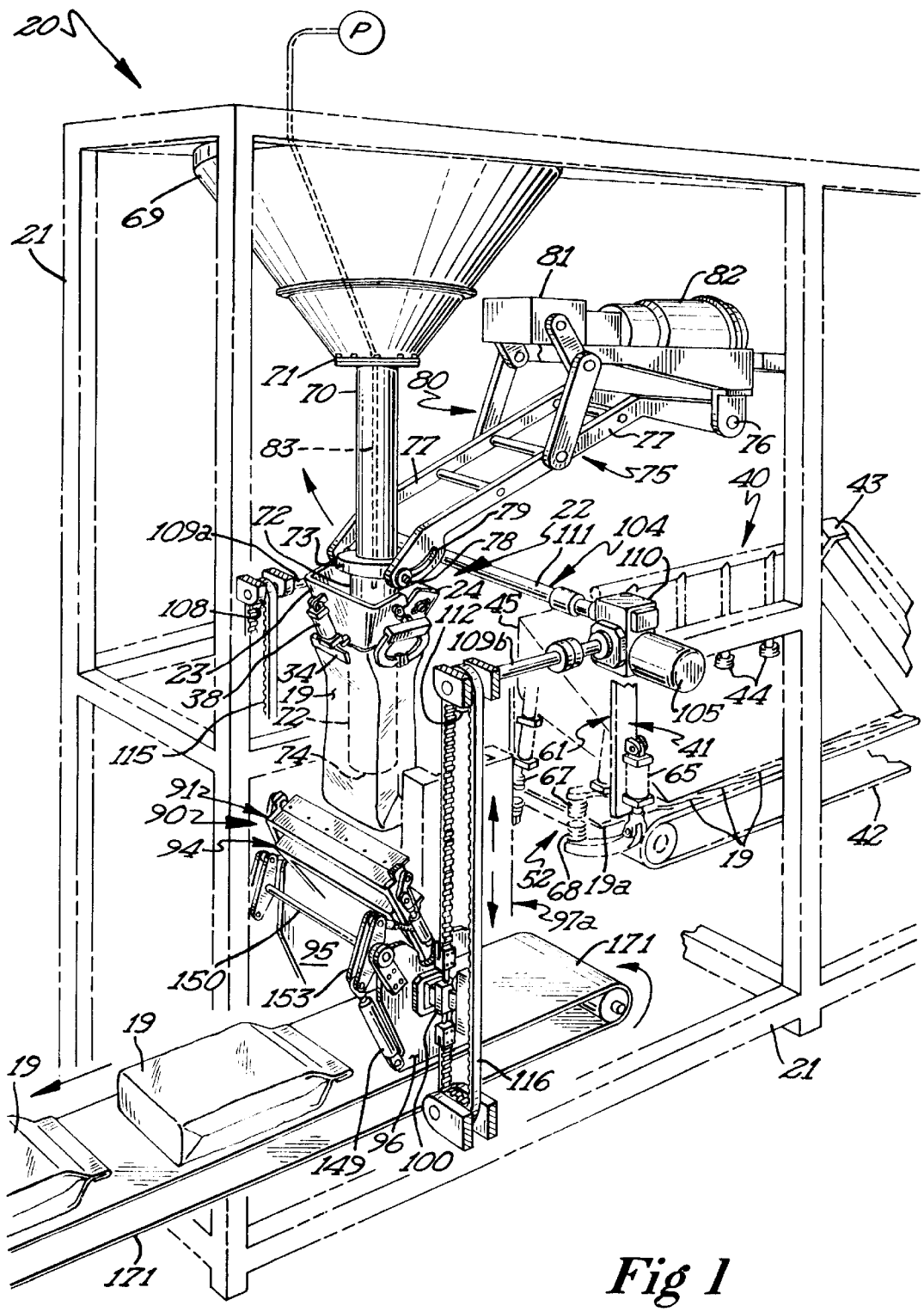
FIG. 1 is a perspective view of a compact bag filling machine according to the present invention.

FIG. 1 illustrates a machine incorporating an automatic bagging system having the fully controlled and coordinated bag handling, filling, and sealing components and features of this invention. The machine is generally indicated by reference numeral 20, and is mounted on a frame assembly which includes vertical and horizontal frame members and which is generally indicated in phantom lines at 21. It is to be understood that any frame assembly 21 capable of supporting the requisite parts of the present invention may be utilized.

FIG. 1 is a perspective view of the machine, which includes a material discharge spout 22. Spout 22 is preferably of the clam shell type, and is comprised of a pair of clam shell halves 23 and 24 which are pivotal between open and closed positions about pivot pin connections 25 and 26 at the lower, discharge end of spout 22. Examples of material discharge spouts 22 suitable for use within the bag filling machine 20 are given in U.S. Pat. No. 4,322,932 (Bag Filling and Handling Apparatus), U.S. Pat. No. 4,526,214 (Bag Filling Apparatus), U.S. Pat. No. 5,349,996 (Bag Filling Apparatus Having Dust-Tight Spout) and U.S. Pat. No. 5,771,667 (Bag Filling, Closing, and Sealing Machine), all of which were issued to Harold McGregor and are commonly assigned with the present application. The disclosures of U.S. Pat. Nos. 4,322,932, 4,526,214, 5,349,996 and 5,771,667 are hereby incorporated by reference. A suitable spout 22 is normally arranged to communicate with a material supply hopper 27 into which pre-apportioned charges of particulate material are dispensed, as by a net weight scale apparatus(not shown), for filling bags 19 one at a time with a desired quantity or weight of a material. The spout and apparatus as disclosed are designed to be utilized for filling bags of the open mouth type with free flowing, particulate material, including feed, seeds, etc. It is contemplated that various materials may be effectively dispensed into bags and sealed by the machine as disclosed herein, including material such as pet food and cereals.

Figure 2:
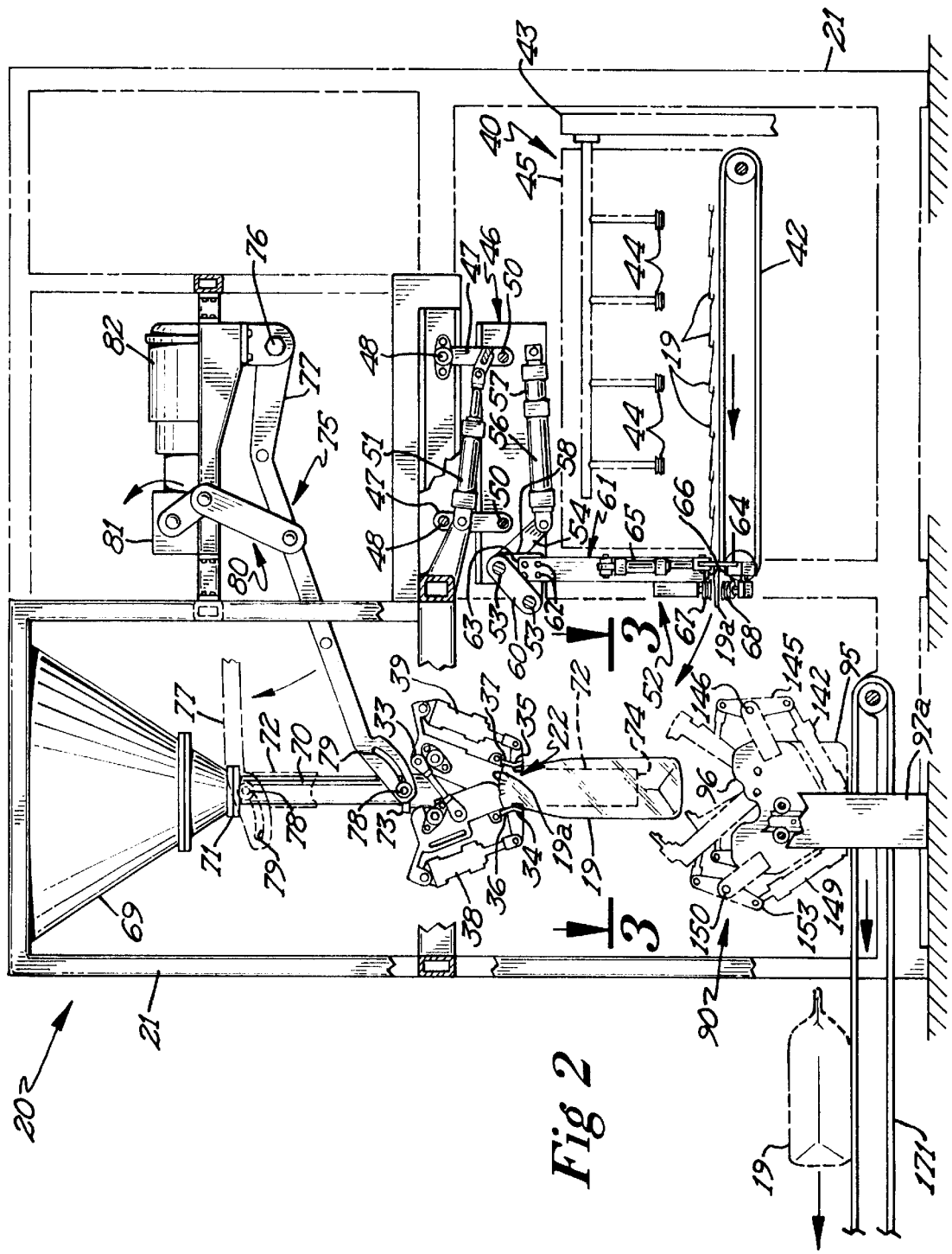
FIG. 2 is a side elevational view of the bag filling machine of FIG. 1.

For the purpose of actuating the spout clam shell sections 23 and 24 between an open, material dispensing position and a closed position, a power cylinder is preferably mounted between the frame assembly 21 and clam shell spout half 23. Such a clam shell spout assembly and its power cylinder actuator are disclosed in aforementioned U.S. Pat. No. 4,322,932, particularly with reference to FIG. 4 thereof. As disclosed in the '932 patent, the clam shell assembly further includes a connecting rod 33 extending between the upper ends of the two clam shell sections 23 and 24. With this arrangement the pivotal movement of clam shell half 23 initiated by the power cylinder connected between the frame assembly 21 and clam shell half 23, transmits pivotal movement to the second, clam shell half 24 by means of connecting rod 33. When the piston of the power cylinder connected between the frame assembly 21 and clam shell half 23 is retracted, clam shell sections 23 and 24 are moved to their open positions. As shown in FIG. 2, with the piston extended, the clam shell sections are closed, and no bag filling operation is taking place.

As also disclosed in the '932 patent, spout 22 may be provided with bag clamping means which comprise a pair of bag clamps 34, 35 pivotally mounted adjacent the opening of the spout 22. Each of the bag clamps 34, 35 are mounted upon identical pivotal support arms 36, 37 and are actuated between an open position and a closed position by identical clamp cylinders 38, 39. Bags 19 may be placed on the spout 22 when the bag clamps 34 and 35 are in their open position and are subsequently clamped firmly to the spout 22 when the bag clamps 34, 35 are in their closed position. Bag clamps 34 and 35 are illustrated in their open and closed positions in FIG. 4 of the '932 patent.

Though the use of bag clamps 34, 35 is sufficient to hold a bag 19 to the spout 22 for filling, it is desirable to utilize bag grasping members such as the bag gripping assemblies described in U.S. Pat. No. 5,349,996, the specification of which is hereby incorporated by reference. Such bag gripping assemblies allow for more complete control of the bag 19 during the filling process. Bag gripping assemblies such as those disclosed in the '996 patent may be utilized with bags 19 which have gussets formed into their sides and also with bags 19 having straight or flat sides. However, where bags 19 have gussets formed in their sides, it is preferably to utilize gusset gripping assemblies of the type described in U.S. Pat. No. 5,768,863, the disclosure of which is also hereby incorporated by reference.

As shown in FIGS. 1 and 2, the machine also includes a bag supply apparatus generally indicated by reference numeral 40. It is contemplated that various types of bag transporting and conveying mechanisms may be utilized to deliver bags one at a time in position to be picked up and placed on spout 22 by a transfer arm assembly generally indicated by reference numeral 41. The bags 19 may be made of plastic or paper materials, and may be of the pinch bottom or flat bottom type, and have either gusseted or straight side walls.

Bags 19 are preferably placed on the horizontal conveyor 42 by a swing arm mechanism 43 which carries suction cups 44 thereon. The swing arm mechanism 43 rotates between a bag pick up position above a bag storing and supply apparatus (not shown) and a bag delivery and release position for delivering a bag 19 onto the conveyor 42 in a shingled fashion.

The bag storing and supply apparatus is preferably an in-feed conveyor arranged to present a bag 19 or small stacks of bags 19 to the swing arm mechanism 43 for placement on the conveyor 42. An electric eye (not shown) is used to advance the in-feed conveyor of the bag storing and supply apparatus to continuously present additional bag(s) 19 to the swing arm mechanism 43 for placement on the conveyor 42. Alternatively, a carousel-type bag storing and supply mechanism may be utilized. A suitable carousel type bag storing and supply apparatus is disclosed in U.S. Pat. No. 4,884,389, the disclosure of which is hereby incorporated by reference.

The preferred transfer arm assembly 41 is of the same basic construction and operation the transfer arm assembly disclosed in U.S. Pat. No. 4,432,186, the disclosure of which is incorporated by reference. As disclosed in that patent, and with particular reference to the portion of the specification describing FIGS. 15 and 16 thereof, a swingable carriage 46 is mounted to carriage arms 47 at pivot points 48. In turn, carriage arms 47 are pivotably mounted to frame 49 at pivot points 50. Carriage 46 is generally rectangular in shape and its movement relative to frame assembly 21 is controlled by carriage cylinder 51. Carriage cylinder 51 is actuable to move the carriage 46 between a first, bag grasping position, and a second, bag hanging position. A hanging mechanism, generally 52, is pivotally mounted to carriage 46 along shaft 53. Hanging mechanism 52 is pivoted about axis 53 by means of an actuating arm 54 connected to a two-stage cylinder 55 having a first stage 56 and a second stage 57. The other end of two-stage cylinder 55 is pivotably mounted to carriage 46. The hanging mechanism 52 is pivotable about axis 53 between a first, bag grasping position, and a second, bag hanging position.

Hanger mounting plates 58 are slidably mounted on shaft 53 at the upper end, and arm lead screw 59 at the lower end thereby providing for adjusting the width of hanger mechanism 52. As can be seen, lead screw 59 is oppositely threaded on the two ends so as to provide coordinated adjustment. End plates 60 are fixably mounted to shaft 53 at their upper end and allow the rotation of lead screw 59 therein at their lower end while confining lead screw 59 so as to impart a rotational motion about shaft 53 to hanger mechanism 52. Hanger arm 61 extends downwardly from mounting plates 58. Hanger arms 61 are mounted to mounting plates 58 by means of fasteners 62 and rubber spacing blocks 63. Spacing blocks 63 allow a slight amount of lateral motion to be imparted to hanger arm 61 by means of a spread cylinder (not shown) which is mounted between hanger arms 61. The spread cylinder, when actuated, serves to insure the tautness of the bag 19.

Pivotably mounted on the bottom end of hanger arms 61 are clamping arms 64. Clamping arms 64 are actuated by means of clamping cylinders 65 mounted on the outer side of hanger arms 61. Rubber gripping pads 66 are located both on the bottom side of hanger arms 61 and on the top side of clamp arms 64. Fixed vacuum cups 67 and movable vacuum cups 68 are connected to a vacuum source with fixed cups 67 being located at the bottom end of hanger arms 61 and movable cups 68 being located on clamp arms 64. Cups 67 and 68 serve to slightly draw open the mouth of the bag once it is clamped in order to ease the hanging of the bag on the filling chute. The vacuum cups 67 and 68 comprise clamping devices which insure positive, controlled clamping of the leading edge 19a of each bag 19 advanced intermittently on conveyor 42.

Once a plastic or paper bag 19, is secured to the spout 22 by the hanger arms 61, the bag 19 may be filled. A predetermined quantity of material, typically supplied by a bulk supply hopper (not shown) and weighed in a net weigh scale (not shown), is deposited in a supply hopper 69 mounted immediately above the spout 22 on frame assembly 21. An inner supply tube 70 is connected to an outlet 71 of the supply hopper 69. The inner supply tube 70 extends downward and terminates in the spout 22. Slip tube 72 is received over the inner supply tube 70 and is supported from slip tube flange 73. The slip tube 72 may be moved vertically between an upper, inoperative position in which the lower end 74 of the slip tube 72 is withdrawn into the spout 22 and a lower, operative, filling position, in which the lower end 74 of the slip tube 72 is extended down through the open spout clam shell sections 23 and 24 and into a bag 19 that is clamped to the open spout 22 for filling.

The slip tube 72 is moved between its upper and lower positions by lever arm 75. Lever arm 75 pivots about pivot axis 76 and comprises parallel side arms 77 which straddle the slip tube flange 73. Pegs 78 on slip tube flange 73 are received in curvilinear slots 79 formed in the ends of each side arm 77. The curvilinear slots 79 are shaped such that the rotary motion of the lever arm 75 may be translated into vertical motion of the slip tube 72. A rotary linkage 80 is connected between a gearbox 81 and the lever arm 75 to move the lever arm between its upper and lower positions. A motor 82 provides motive power to the gearbox 81 for moving the slip tube 72 between its upper and lower positions.

Material to be placed in the bag 19 passes into the bag 19 from the supply hopper 69 through the inner supply tube 70 and the slip tube 72. By using a slip tube 72, a bag 19 may be filled from the bottom, thereby reducing the amount of dust that would otherwise be produced and promoting the rapid settling of the material within the bag 19. As the bag 19 fills, the slip tube 72 is raised so as to maintain the lower end 74 of the slip tube 72 near the fill level of the material within the bag 19. When the bag 19 has been filled, the slip tube 72 is withdrawn from the bag 19 to its upper, inoperative position. Once the lower end 74 of the slip tube 72 has cleared the spout clam shell sections 23 and 24, the spout 22 closes and the bag is removed from the spout 22 and sealed shut by a bag sealing mechanism, as described in detail below.

Alternatively, a vertical bottom fill auger assembly as disclosed in U.S. Pat. No. 5,109,894, the disclosure of which is hereby incorporated by reference, may be used in place of the slip tube assembly described above. For example, the inner supply tube 70 and the slip tube 72 may be replaced with a fill tube 146 and vertical auger 148 as illustrated in FIG. 1 of the '894 patent. In such an alternate embodiment, the lever arm 75 and its associated linkage 80 would not be necessary.

Either of the slip tube 72 or the fill tube 70 may be provided with a nozzle such as that indicated in phantom lines at 83 in FIG. 1. The nozzle 83 is connected to a blower means or vacuum pump P which would be capable of drawing air from the head space of a filled bag 19 immediately prior to the closing of the bag top 19a. The provision of a blower nozzle 83 reduces the volume of air that would be sealed into a bag 19 and promotes the settling of the material placed in the bag 19.

Referring generally to FIGS. 4–10, a bag closing apparatus according to the present invention is indicated generally at 90 and is comprised of a pair of crimping bar assemblies 91, 92 and a pair of forming bar assemblies 93, 94 that are pivotally mounted between parallel side plates 95, 96. The bag closing apparatus 90 is in this preferred embodiment arranged for vertical movement between a pair of carriage track columns 97a, 97b. Carriage track column 97a has secured thereto a V-roller track 98. V-rollers 99 are secured to a roller mount 100 so as to ride along V-roller track 98 on column 97a. Similarly, straight rollers 101 are secured to straight roller mount 102 so as to ride upon a straight roller track 103 mounted on column 97b. Roller mounts 100 and 102 are secured to parallel side plates 95, 96 so as to permit the bag sealing apparatus 90 to be moved vertically on the respective roller tracks 98 and 103 between a lower, rest and bag release position, and a upper, bag grasping position.

Figure 3:
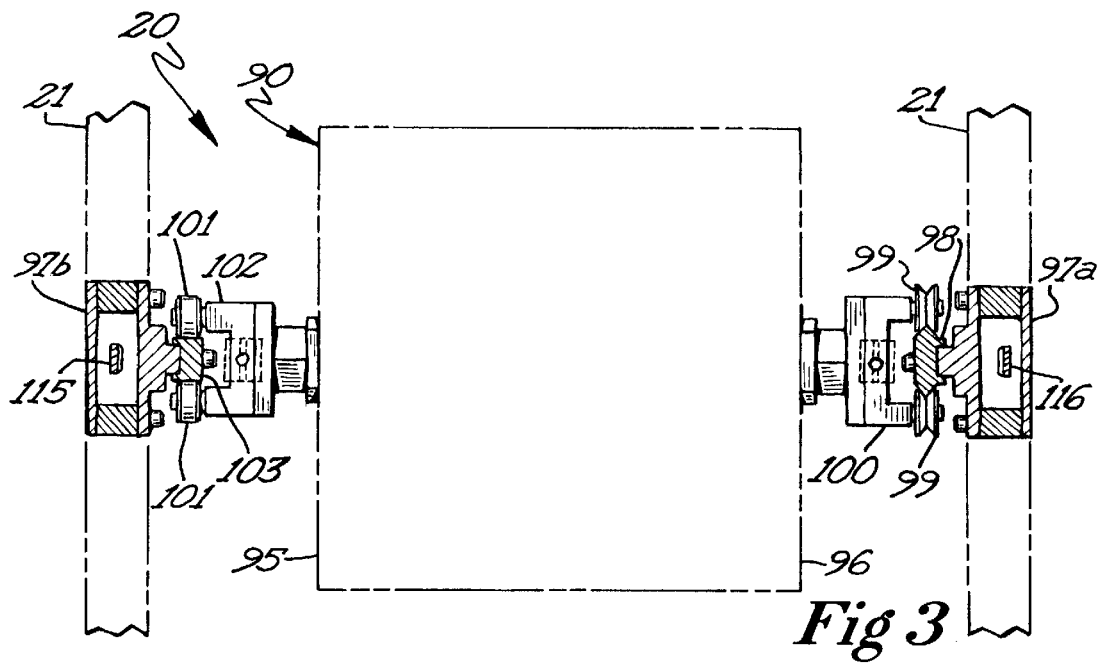
FIG. 3 is a partial top view of the bag closing and sealing apparatus taken along cutting lines 3—3 in FIG. 2.
Figure 4:
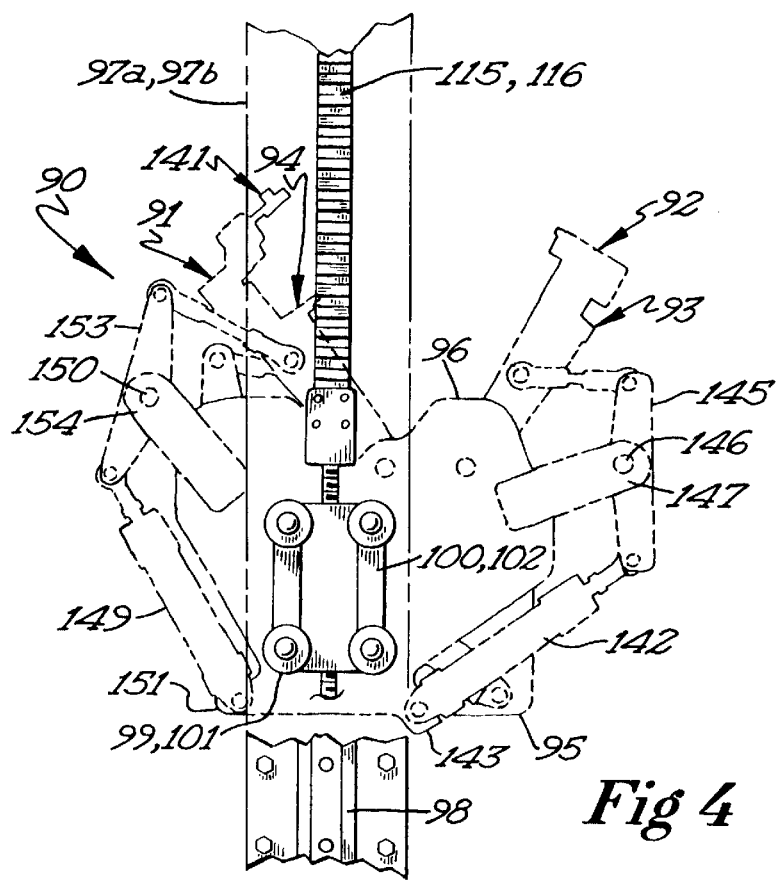
FIG. 4 is a partial side view of a bag closing and sealing apparatus according to the present invention.

A drive mechanism for moving the bag sealing apparatus 90 between its upper and lower positions is indicated generally in FIG. 1 at 104 The drive mechanism 104 receives power from a rotary motor 105 which is connected by shaft 106 to a right angle gear box 107. Gear box 107 is connected to a sprocket 108 by shaft 109a and to a second right angle gear box 110 by shaft 111. The second gearbox 110 is in turn connected to a second sprocket 112 through shaft 109b. As can be seen in FIGS. 1 and 3–4, sprockets 108 and 112 are mounted above and in alignment with roller tracks 98 and 103, respectively. Each sprocket 108, 112 has a respective opposing sprocket 113, 114 mounted at the opposite end of their respective roller tracks 98, 103. Sprockets 108 and 113 have supported therebetween a chain or toothed belt 115. The toothed belt 115 is passed around sprockets 108 and 113 and its respective ends are connected to the top and bottom of the v-roller mount 100. Sprockets 112 and 114 also have either a chain or toothed belt 116 supported therebetween. Toothed belt 116, like belt 115 is passed around sprockets 112 and 114 and has its respective ends connected to the top and bottom of the straight roller mount 102. Motor 105 actuates gear box 107 and, through shaft 111, gear box 110. The gear boxes 107, 110 in turn act through respective shafts 109a, b to rotate sprockets 108, 112. In rotating, the sprockets 108, 112 move belts 115, 116 so as to move the bag sealing apparatus 90 between its upper and lower positions illustrated in FIGS. 2 and 5, respectively.

Crimping bar assembly 92 is comprised of a crimping bar 117 that is mounted on a pair of leg members 118, 119. The crimping bar assembly 92 pivots about a pivot axis 120. Forming bar assembly 93 is similarly comprised of a forming bar 121 that is mounted upon leg members 122, 123 and is also pivotable about pivot axis 120. Forming bar assembly 93 is narrower than crimping assembly 92 and has shorter leg members 122, 123 so that the forming bar assembly 93 may rotate within crimping bar assembly 92 about pivot axis 120.

Crimping bar assembly 91 is comprised of a crimping bar 124 mounted on leg members 125, 126. Leg members 125, 126 pivot about pivot axis 127. Forming bar assembly 94 is comprised of a forming bar 128 mounted on leg members 129, 130. Leg members 129, 130 are also pivotable about pivot axis 127. Similar to the arrangement of crimping bar assembly 92 and forming bar assembly 93, forming bar assembly 94 is narrower than crimping assembly 91 and has shorter leg members 129, 130 so that the forming bar assembly 94 may rotate within crimping bar assembly 91 about pivot axis 127.

Crimping bar assemblies 91, 92 are arranged to engage a bag top 19a at the location where the top 19a is to be creased and folded over for sealing. Forming bar assemblies 93, 94 are arranged to engage and hold a bag 19 somewhat above the level to which the bag 19 has been filled and below the point at which the crimping bar assemblies 91, 92 engage the bag top 19a. The preferred embodiment of the bag sealing apparatus 90 illustrated in FIGS. 5–10, is intended to address a bag 19 to be sealed from below. However, it is to be understood that by modifying the arrangement of the forming bar and crimping bar assemblies, the bag sealing apparatus 90 may be adapted to addressing bags to be sealed from above rather than from below.

Forming bars 121, 128 are symmetrically opposable with one another, i.e. they are constrained to operate in conjunction with one another. Forming bars 121, 128 are pivotable between a first, open position wherein the forming bars 121, 128 are rotated apart from one another, and a second, closed position, wherein the forming bars 121, 128 are rotated into contact with one another. The respective faces 131, 132 of the forming bars 121, 128 are arranged so that forming bars 121, 128 may firmly grasp a bag 19 that is to be sealed by the bag sealing apparatus 90. In the preferred embodiment of the bag sealing apparatus 90, face 132 of forming bar 128 is in the form of male tongue, and face 131 of forming bar 121 is in the form of a cooperating female groove. The female groove of face 131 is sized so as to receive the male tongue of face 132, firmly grasping a bag 19 therebetween in the process. It is to be understood that faces 131, 132 of the forming bars may be of any geometric shape or have any surface treatment useful in the grasping of a bag 19. For instance, faces 131, 132 may be roughened as by knurling, to provide a better grip on the bag 19.

Figure 5:
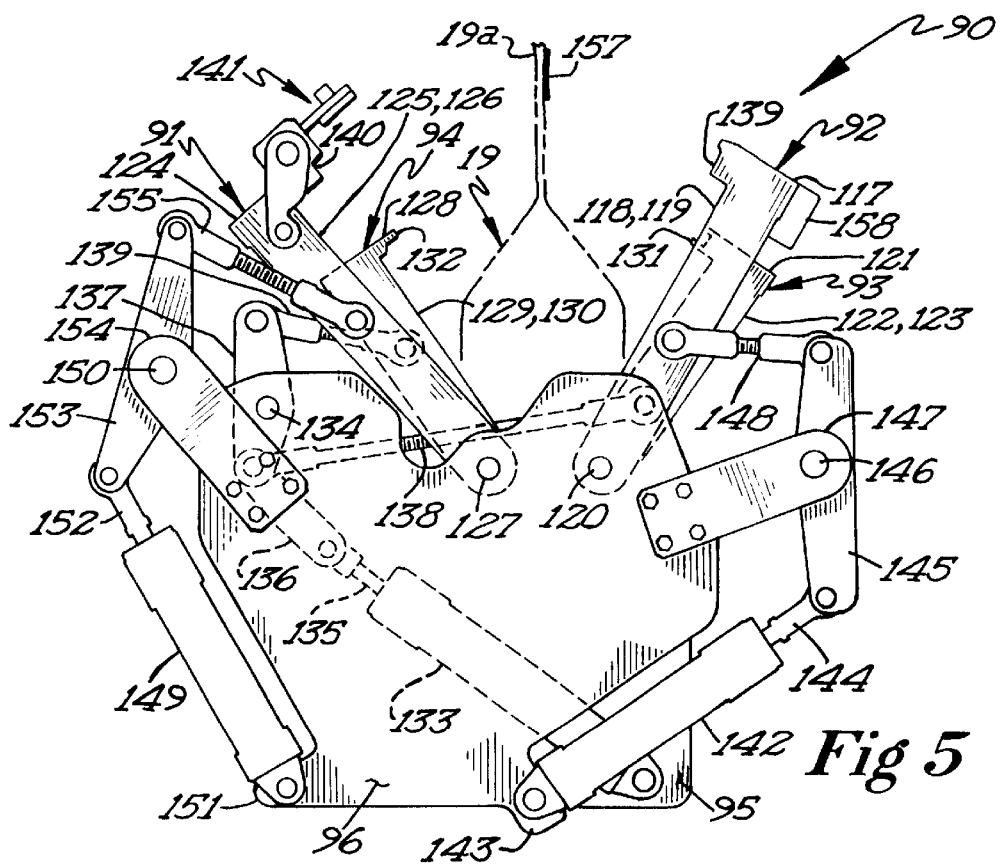
FIG. 5 is a partial side view of the bag closing and sealing apparatus showing the relation between the bag closing and sealing apparatus and a bag to be closed and sealed at the beginning of an operational cycle.
Figure 6:
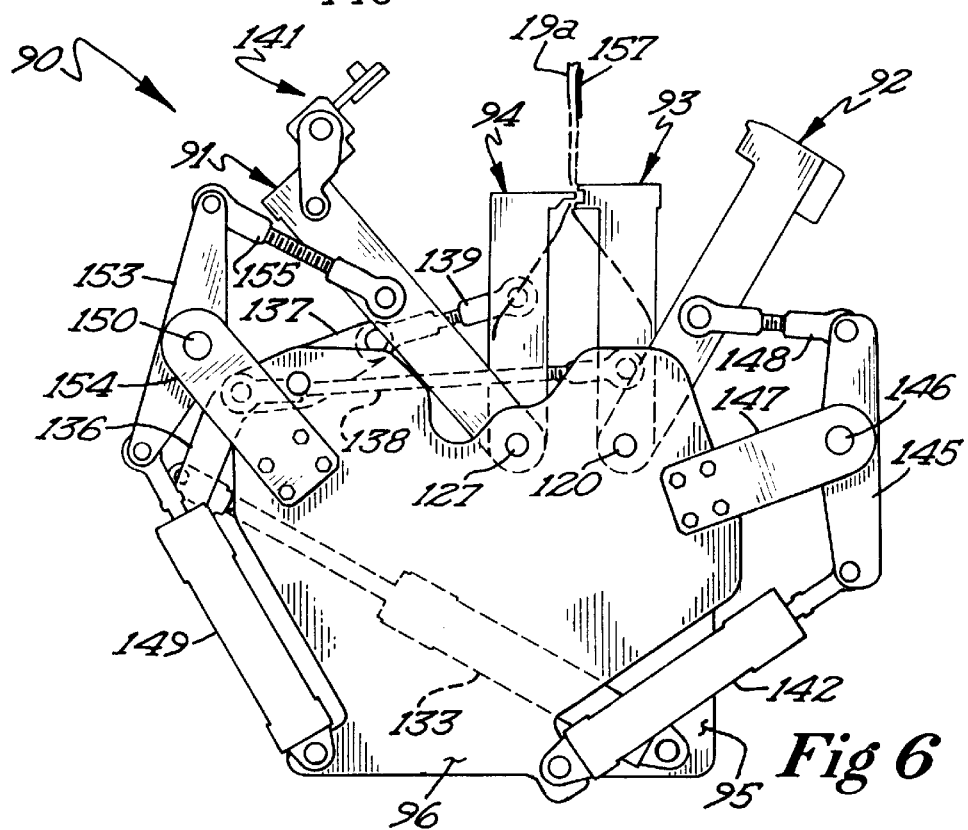
FIG. 6 is a partial side view of the bag closing and sealing apparatus showing a bag securely clamped and grasped between the forming bars of the bag closing and sealing apparatus.

The operating mechanism for actuating the forming bars 121, 128 between their first open position and their second closed position is most clearly viewable in FIGS. 5–8. A reversible double acting power cylinder 133 serves to reversibly actuate an over-center linkage mechanism having a transversely extending crankshaft 134. Power cylinder 133 is pivotally mounted on side plate 95 and its piston 135 is connected through a link 136 with a crank arm 137 mounted on the crankshaft 134. Connecting rod 138 extends between the lower end of crank 137 and oppositely positioned leg member 123 of forming bar assembly 93. A second connecting rod 139 extends from the upper end of crank 137 to adjacent leg member 130 of forming bar assembly 94. To provide even clamping pressure between the forming bars 121, 128, a second crank arm 137 and associated connecting rods 138, 139 are mounted on the crankshaft 134 adjacent side plate 96 to actuate leg members 123, 126. As shown in FIG. 5, with the piston 135 of cylinder 133 retracted, the linkage has moved the forming bars 121, 128 apart to their fully opened positions. Upon the extension of the piston 135 of cylinder 133, to the position shown in FIG. 6, the aforesaid mechanical linkage will pivot forming bars 121, 128 towards each other to their closed, bag engaging and clamping positions. A strong, effective closing and clamping action of the forming bars 121, 128 is achieved upon the extension of piston 135, as it operates the aforesaid linkage to pull connecting rod 139 to the left as viewed in FIG. 6, and to push connecting rod 138 to the right thereby swinging the forming bar assemblies 121, 128 towards each other so as to place forming bars 121, 128 in their closed positions as shown in FIG. 6.

Crimping bar assemblies 91, 92 are operable independent of one another. Crimping bar assemblies 91, 92 are pivotable between first, open positions in which the respective crimping bars 124, 117 are rotated away from one another, and closed positions in which the respective crimping bars 124, 117 are rotated into contact with one another. Because crimping bar assemblies 91, 92 are independently actuable, the crimping bars 124, 117 may simultaneously be in their closed positions or one may be in its open position while the other is in its closed position.

Crimping bars 117, 124 are constructed such that the faces 139, 140, of the respective crimping bars may cooperate so as to crimp or crease a bag top 19a and partially fold the top 19a that is being sealed by the bag sealing apparatus 90. In the preferred embodiment of the bag sealing apparatus 90, face 140 of crimping bar 124 comprises at its upper edge a crimping projection, with face 139 comprising a crimping projection complementary to the crimping projection of face 140. The respective crimping projections of faces 139, 140 are is arranged to engage one another in a scissors-like action that pinches a bag top therebetween to form a transverse crease C (FIG. 8) across the top 19a of the bag 19. This transverse crease C allows the folding mechanism such as fold-over arm 141, which is mounted to an upper surface of crimping bar 124, to fold the bag top 19a down into contact with the side wall of the bag 19. It should be understood that faces 139, 140 of the crimping bars 117, 124 may be of any shape suitable to pre-fold or crease a bag top 19a prior to the actual closing of the bag top by a bag sealing apparatus 90.

Figure 7:
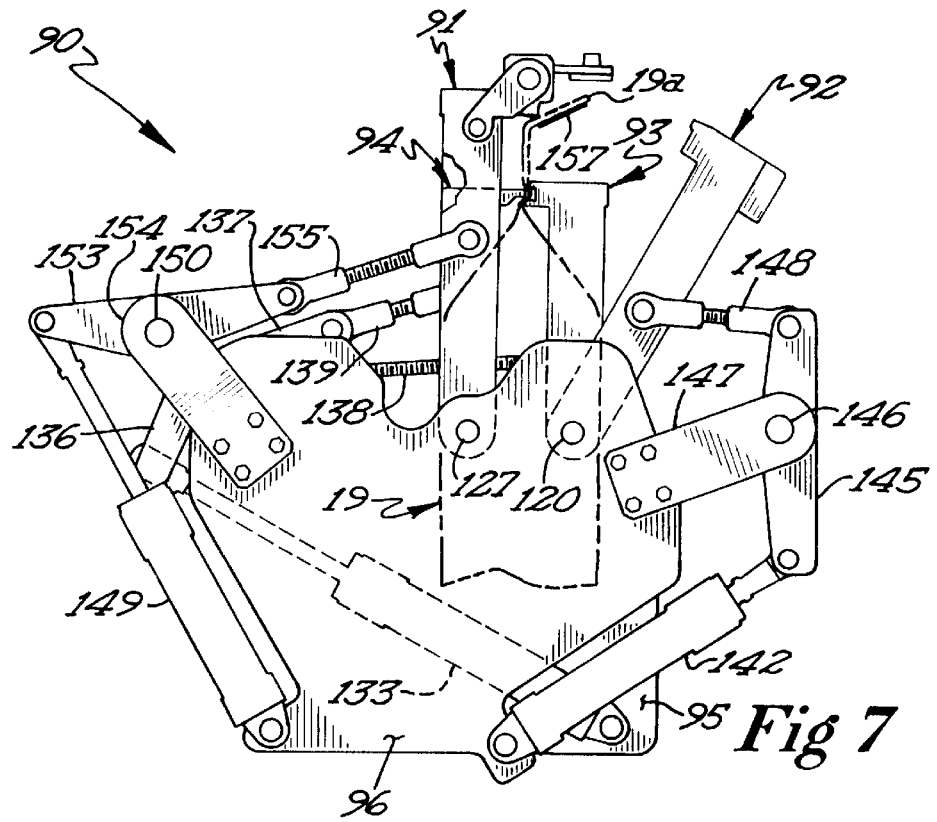
FIG. 7 is a partial side view of the bag closing and sealing apparatus showing the crimping and sealing bars engaging the top of a bag being closed and sealed.

Crimping bar 117, supported on leg members 118, 119 is actuated between its open position, and its closed position by a reversible double acting power cylinder 142. Cylinder 142 is pivotally mounted to a projection 143 of side plate 96. The piston 144 of cylinder 142 is connected to a crank arm 145 mounted upon a transversely extending crankshaft 146. Each of the leg members 118, 119 has associated therewith a crank arm 145, each crank arm 145 being secured to the transversely extending crankshaft 146. The crankshaft 146 is rotatably mounted between a pair of rearwardly extending brackets 147 secured to the respective side plates 95, 96. Each of the leg members 118, 119 is connected to their respective crank arms 145 by respective connecting arms 148. When piston 144 of power cylinder 142 is retracted as illustrated in FIG. 5, the lower end of the crank arm 145 is drawn downward and to the left thereby causing connecting arms 148 to pull leg members 118, 119 to the right, moving crimping bar 117 to its open position. Conversely, extension of piston 144 of power cylinder 142 pushes the lower end of the crank arm 145 upward and to the right, thereby causing connecting arms to push leg members 118, 119 to the left, moving crimping bar 117 to its closed position as illustrated in FIG. 7.

Figure 8:
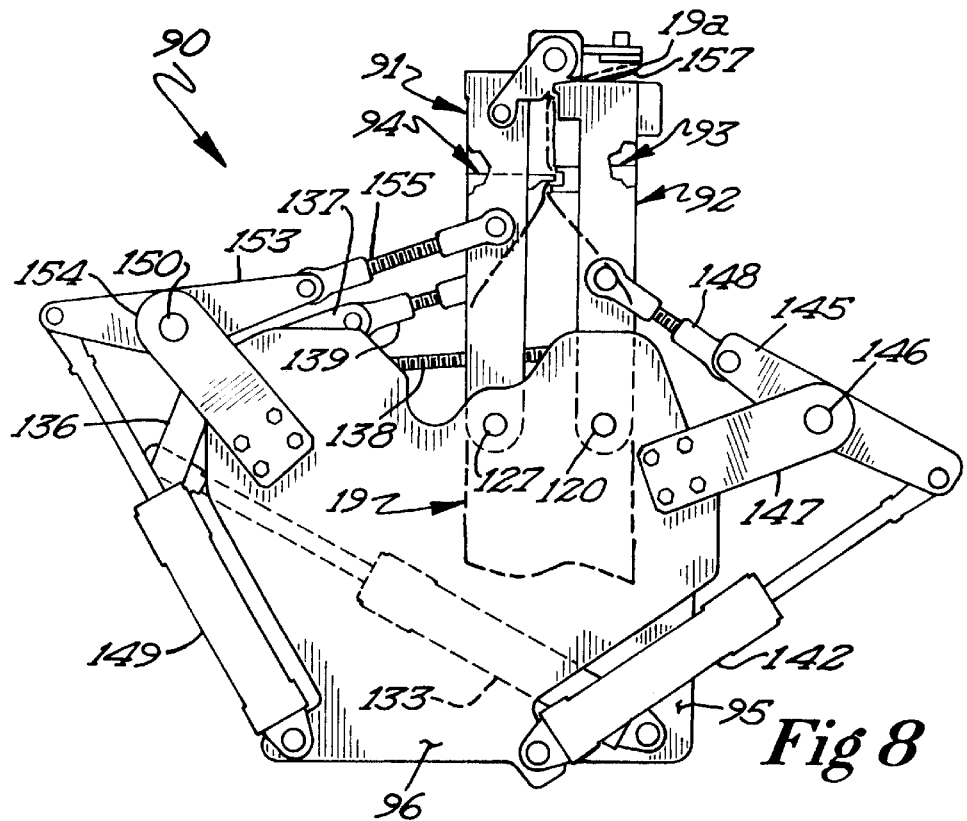
FIG. 8 is a partial side view of the bag closing and sealing apparatus showing the crimping and sealing bar having a thereto preparing to engage and fold over for sealing the top of a bag being closed and sealed.

Crimping bar 124, supported on leg members 125, 126 is actuated between its open position, and its closed position by a reversible double acting power cylinder 149. Power cylinder 149 serves to reversibly actuate an over-center linkage mechanism having a transversely extending crankshaft 150. The power cylinder 149 is pivotally mounted to a second projection 151 of side plate 96. The piston 152 of cylinder 149 is connected to crank 153 that is mounted on crankshaft 150. Crankshaft 150 is rotatably mounted between a pair of upwardly extending brackets 154 mounted to respective side plates 95, 96. Crankshaft 150 has two cranks 153 secured thereto so as to permit the simultaneous actuation of both leg members 125, 126. Cranks 153 are connected at their upper ends to respective leg members 125, 126 by identical connecting rods 155. When piston 152 of power cylinder 149 is retracted as illustrated in FIGS. 5 and 6 the lower end of cranks 153 are pulled downwardly and to the right thereby causing connecting rods 155 to pull leg members 125, 126 to the left, moving crimping bar 124 to its open position. Extension of piston 152 of the power cylinder 149 causes the lower ends of the cranks 153 to be pushed upwardly and to the left thereby causing connecting arms 155 to move leg members 125, 126 to the right, moving crimping bar 124 to its closed position as illustrated in FIGS. 7 and 8.

Where bags 19 are made from paper, crimping bars 117, 124 need only be utilized to mechanically crimp or crease the top of a paper bag 19 that is being sealed. But where the bags 19 are made from plastic, heat sealing mechanisms may be provided for heat sealing the mouths of the plastic bags 19 being filled. In one alternate embodiment of the present invention, a heat sealing cartridge may mounted on crimping bar 117 or 124 with mating grooves or serrations formed on the opposite crimping bar. Alternatively, an impulse heat sealer may also be utilized, and, for the sealing of plastic bags, this is the preferred version. Such a heat sealing element comprises a thin flat conductive wire which extends the height of the vertical face of the crimping or sealing bar 117, 124. Depending upon the thickness and composition of the bags 19 being sealed, two such conductive wires may be utilized, one mounted on the vertical faces 139, 140 of the crimping bars 117, 124. Reference numeral 156 as shown in FIG. 2 generally indicates a heating element carried by crimping bar 117. It is to be understood that either or both of the crimping bars 117, 124 may be outfitted with heating elements 156. In addition to the sealing of plastic bags 19, heating elements 156 may be utilized to seal a plastic liner of a paper bag 19. It is contemplated that the bag sealing apparatus 90 as illustrated in FIGS. 5–8 may be utilized to seal both plastic and paper bags 19 without having to modifying the forming or crimping assemblies 93, 94 or 91, 92, respectively.

Where required, forming bar assemblies 93, 94 may also be provided with heating elements 156 that may be useful in sealing plastic bags 19 or in sealing a plastic liner of a paper bag 19.

Paper bags 19 are preferably sealed by activating a heat sensitive adhesive 157 that has been pre-applied to the side wall of the bag 19 being sealed. In order to activate the adhesive 157, a heater 158 is mounted to the upper surface of crimping bar 117. The adhesive 157 is applied to the outer side wall of the paper bag 19 above the transverse crease C that is formed when the faces 139, 140 of the crimping bars 117, 124 engage the top of the bag 19. The location of the heater 158 is carefully arranged so that when the top portion of the bag side wall having the adhesive 157 applied thereto is folded over by the crimping bar assemblies 91, 92, the adhesive 157 will be brought close enough to the heater 158 to activate the adhesive 157. The heater 158 must be capable of raising the temperature of the adhesive 157 without coming into contact with the adhesive 146. Contact between the heater 158 and the adhesive 157 could prevent the bag sealing apparatus 90 from sealing a bag 19 and would necessitate the frequent cleaning the of the heater 158 and the crimping assemblies 91, 92. The preferred heater 158 is a hot air heater which blows heated air onto the adhesive 157 to activate it. Another type of heater 158 which may be utilized is a radiant heater which activates the adhesive 157 using infrared energy.

Figure 9:
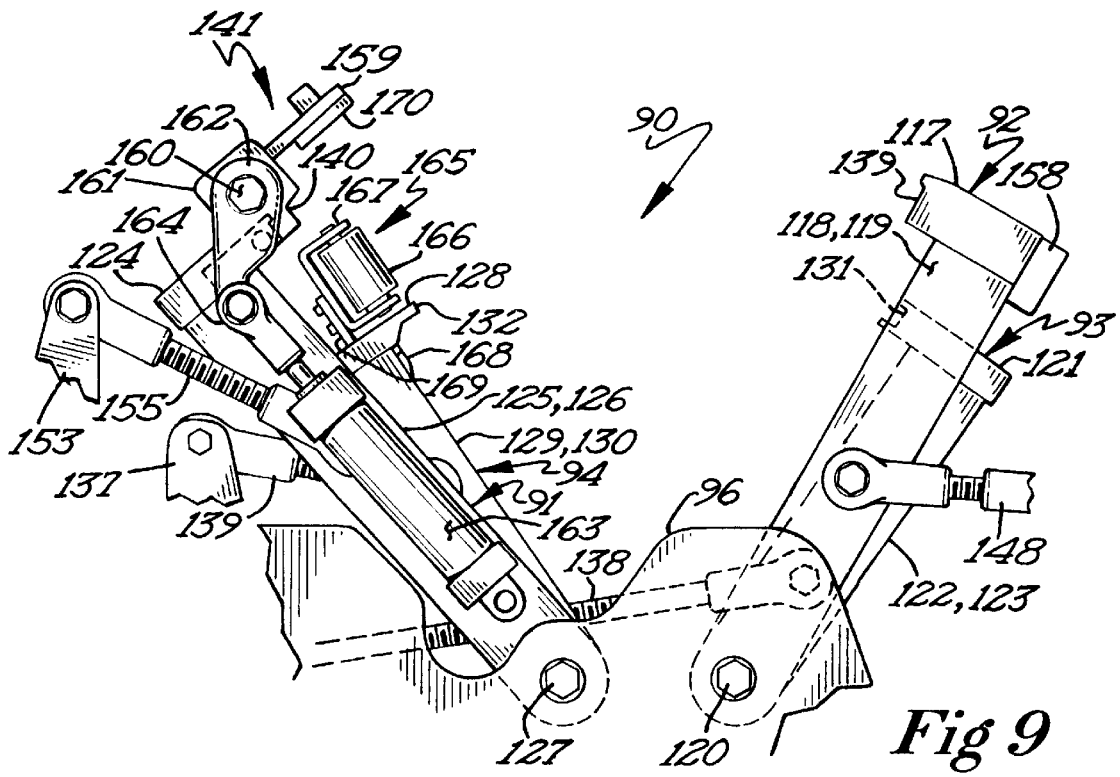
FIGS. 9 and 10 are partial cut away side views illustrating the structure and operation of the of the fold-over arm secured to one of the crimping and sealing bars.
Figure 10:
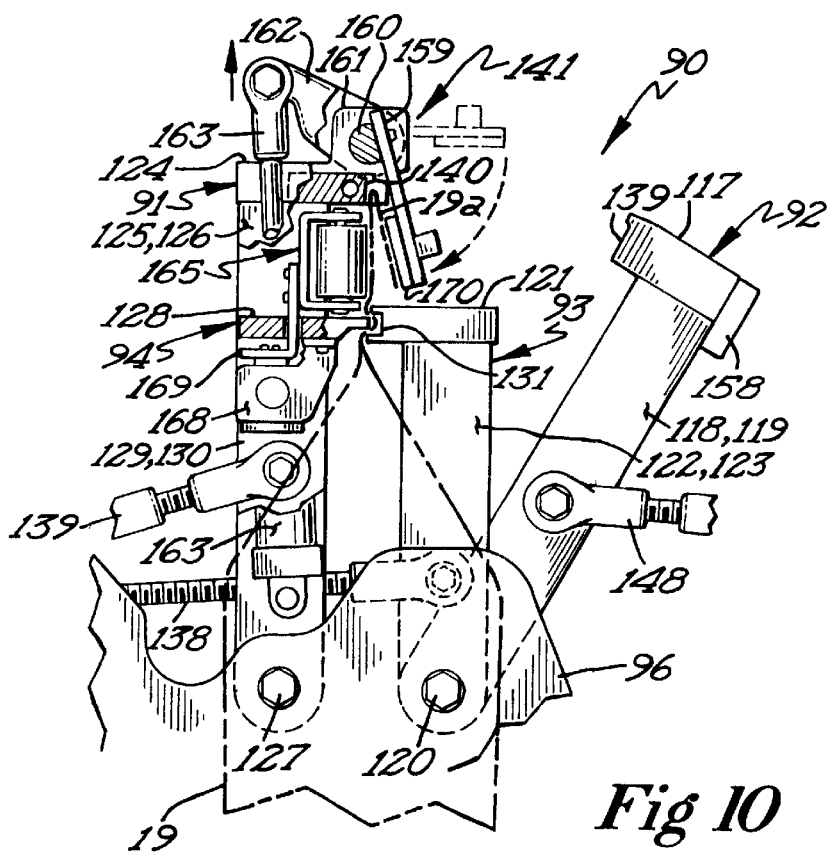

Once a bag top 19a that is being sealed has been crimped by the crimping bar assemblies 91, 92 and the adhesive 157 has been activated by the heater 158, crimping bar assembly 92 is rotated away from crimping bar assembly 91 and fold-over arm 141 is actuated to fold the top of the bag 19 above the transverse crease C into contact with the side of the bag 19 below the transverse crease, thereby sealing the paper bag. Fold-over arm 141 is best seen in FIGS. 9 and 10. Fold-over arm 141 is comprised of a platen 159. secured to a transversely extending shaft 160 that is rotatably mounted in a pair bearings 161 on crimping bar 124. The platen 159 is rotatable between first, open position illustrated in FIG. 9 and a second, closed position, illustrated in FIG. 10. The ends of the shaft 160 extend beyond the ends of the crimping bar 54 and have attached thereto a pair of crank arms 162. Crank arms 162 and hence, the platen 159, are rotated by a pair of reversible, double acting power cylinders 163. Power cylinders 163 are pivotally mounted on the outer surface of leg members 125, 126 and pistons 164 of cylinders 163 are connected to crank arms 162. A single power cylinder 163 may be utilized to rotate the platen 159 to its closed position in sealing a bag top, however, it is believed that the use of two cylinders 163 leads to a more uniform sealing pressure across the folded bag top. When the pistons 164 of cylinders 163 are retracted, as shown in FIG. 9, the crank arms 162 are rotated downward, toward the cylinders 163 and the platen 159 is rotated upward to its open position. Extension of the pistons 164 rotates the platen 159 downward into its closed position, as shown in FIG. 10.

In its closed position, the fold-over arm 141 applies clamping pressure to the folded bag top in order to ensure that the adhesive 157 may properly seal the bag top closed. A backing mechanism 165 is secured to the upper surface of forming bar 128 so as to oppose the platen 159 of the fold-over bar 141. The backing mechanism 165 may be as simple as a stationary plate welded to the top of the forming bar 128. However, it is preferred to utilize a plurality of straight rollers 166 mounted within a horizontally reciprocable roller frame 167 as a backing mechanism. A horizontal double acting roller actuation cylinder 168 is secured beneath the forming bar 128. Bracket 169 is secured to the piston of the cylinder 168 and connects cylinder 168 to the roller frame 167 to permit reciprocation of the rollers 166. Platen 159 has a pad 170 secured thereto and across the entire width of the platen 159. In the preferred embodiment, the pad 170 is of a soft, elastomeric material, though it may be desirable to utilize a stiffer material such as a nylon or Teflon (TM). When a bag top 19a has been folded over by the fold-over arm 141 and platen 159 is exerting pressure through the folded bag top against the rollers 166, cylinder 168 is actuated to cause the rollers 166 to reciprocate. The reciprocating pressure exerted upon the bag top by the rollers 166 as they move back and forth across the bag top 19a, causes the folded over bag top 19a to be more evenly adhered to the bag side wall.

A horizontal conveyor 171 as shown in the various Figures of the drawing and particularly FIGS. 1 and 2, is positioned at the bottom of the frame assembly 21 under bag sealing apparatus 90 to receive filled bags 19 one at a time as the bag sealing apparatus is lowered to its bottom position as illustrated in FIG. 2. It is to be understood that various types of conveying devices could be utilized to receive filled bags one at a time from the machine 20, and to deliver the bags out of the machine. Filled bags 19 may be deposited in an upright position for removal on conveyor 180. Alternatively, guide baffles or contact rods (not shown) disposed in the path of the filled bags 19 as they are released from bag sealing mechanism 90 may be utilized to deflect the bags to a horizontal position for removal on conveyor 171, if desired. Preferably, filled bags 19 will be released by the forming bar assemblies 93, 94 of the bag sealing apparatus 90 after the bottoms of the filled bags have contacted the moving conveyor 171 and been offset from the top of the filled bags 19. Releasing the filled bags 19 when the bottom of the filled bag 19 is not placed directly beneath the top of the bag will cause the bag 19 to tip over onto its side of its own accord without the need of guide baffles or contact rods.

Operational Sequence of Bag Filling Machine

The operation of the machine 20 through a complete cycle is fully controlled and automated to selectively position the several operating components, including spout 22, transfer arm assembly 41, and bag sealing apparatus 90 in optimum, cooperative positions for maximum, high speed handling and filling of bags 19. The top 19a of each bag 19 is positively gripped and controlled from the supply station 40, through the operation of transfer arm assembly 41, the filling of bags on spout 22, the sealing of bags 19 by crimping bar assemblies 91, 92 and forming bar assemblies 93, 94 on bag sealing apparatus 90, and the ultimate delivery of filled bags onto conveyor 171.

As the bag filling machine is intended to operate continuously, each distinct operating cycle may be overlapped by preceding and succeeding cycles. However, in general, each operating cycle commences with the various components of the bag filling machine 20 in the positions shown in FIG. 2. At this point in time, the bag sealing apparatus 90 is at its lower, rest and bag release position, with forming bar assemblies 93, 94 and crimping bar assemblies 91, 92 swung to their open positions. Spout 22 is typically closed at the beginning of a cycle but is in FIG. 2 illustrated as being open with a bag 19 suspended therefrom by bag clamps 34, 35 for the filling of the bag 19. The transfer arm assembly 41 begins each cycle in substantially the position as shown in FIG. 2, with suction clamps 67 and 68 open. A supply of bags 19 is provided, preferably in a shingled fashion as shown in FIGS. 1 and 2 on supply conveyor 42.

The bag supply apparatus (not shown) is preferably of the in-feed conveyor type or, alternatively, the bag supply apparatus 40 may be of the carousel type as described above with respect to U.S. Pat. No. 4,884,389. In either case, the preferred swing arm mechanism 43 incorporating a plurality of suction cups 44 is actuated as described in the '389 patent with respect to FIGS. 2–4 to pick up a bag 19 from the bag supply mechanism (not shown). The arm 43 then swings to a bag release position to drop the bag 19 so that the bag 19 is guided onto the supply conveyor 42. This process is repeated to provide a shingled formation of bags 19 on the conveyor 42. A sensor, such as an electric eye (not shown) is positioned to detect the leading edge 19a of a bag 19 positioned at the delivery end of conveyor 42 as shown in FIGS. 1 and 2 for pickup by transfer arm assembly 41. When the sensor provides a signal that a bag 19 is in position for pickup, clamping cylinders 65 are extended on clamping arms 64 to grasp the top of bag 19. At this stage, carriage 46 is in its bag grasping position as are bag hanger arms 61.

In hanging a bag 19 on the spout 22, carriage cylinder 51 is retracted to swing the carriage 46 outwardly while at the same time the first stage 56 of two-stage cylinder 55 extends, thereby swinging hanger arms 61 outwardly and upwardly and placing bag 19 closely adjacent to spout 22 which is in the process of finishing the filling of a bag 19 thereon. When the bag 19 filled during the preceding operational cycle has been removed from the spout 22 and is being sealed and lowered to out feed conveyor 171 by the bag sealing apparatus 90, the second stage 57 of cylinder 55 extends, thereby placing bag 19 in position on spout 22 where it may be gripped and clamped by spout bag clamps 34, 35 and gusset forming and holding clamps as described in more detail above. As soon as the bag has been gripped at spout 22, gripper cylinders 65 retract thereby releasing the bag 19 from the bag clamping arms 64.

With a bag 19 thus securely clamped on spout 22, carriage cylinder 51 and cylinder 55 are actuated to move bag clamping arms 64 to their first, bag grasping position as indicated in FIG. 2 to pick up the next empty bag 19 from conveyor 42 as described above.

When the sensing eye detects the absence of the leading edge of a bag at the forward end of conveyor 42, the conveyor 42 is indexed forward and stops. The swing arm mechanism 43 is then again actuated to pick up a bag 19 from the bag storage and supply apparatus and drop it onto conveyor 42. Thus, conveyor 42 is intermittently indexed forward in coordination with the grasping of the lead bag 19 by the bag clamping arms 64 of transfer arm assembly 41.

When bag sealing apparatus 90 has moved downwardly with the previously filled bag 19 to a position below the bottom of the next, empty bag 19 hanging on spout 22, spout 22 is opened by its actuating cylinder (not shown). As spout 22 is opening, motor 82 is actuated to rotate rotary linkage 80 to move the slip tube 72 from its upper, inoperative position, to its lower, bag filling position in which the lower end 74 of the slip tube 72 is extended through the opened spout 22 and into the bag 19 clamped to the spout 22. Material to be placed in the bag 19 then passes into the bottom of the bag 19 from the lower end 74 of the slip tube 72. As motor 82 continues to actuate rotary linkage 80, and as bag 19 begins to fill, the lower end 74 of the slip tube 72 begins to rise up from its position near the bottom of the bag 19, thereby filling the bag 19 from the bottom up. The slip tube 72 then finishes its stroke and is retracted back into the spout 22. Filled bag 19 as thus located, is substantially centered over bag sealing apparatus 90 in position to be engaged by the forming bar assemblies 93 and 94 and crimping bar assemblies 91 and 92. At this point in the cycle, the filling of a bag 19 has been completed, and the actuating cylinder (not shown) is again actuated to move the clam jaws 23 and 24 to a fully closed position.

Next, a servomechanism or other control device actuates drive motor 105. The rotation of drive shaft 106 serves to revolve toothed carriage lift belts 115 and 116 so as to raise bag sealing apparatus 90 upwardly to the position shown in FIG. 5, with the forming and crimping bars open. Cylinder 133 is then actuated to rotate crank 137 and to thus pivot forming bar assemblies 93 and 94 inwardly into clamping engagement with the opposite sides of bag top 19a as shown in FIG. 6. This event serves to trigger the actuation of cylinders 38 and 39 so as to swing spout clamps 34 and 35 to their open, bag releasing positions, thereby releasing the filled bag 19 to the bag closing apparatus 90.

The servomechanism thereafter again actuates drive motor 105 in a reverse direction so as to revolve belts 115 and 116 in a direction so as to lower bag sealing apparatus 90. This is done in order to clear the top area 19a of the bag mouth from the bottom end of spout 22. When the of bag sealing apparatus 90 has been lowered to the position shown in FIG. 7, i.e. when the bag top 19a has cleared the lower lip of the spout 22, power cylinders 142 and 149 are actuated. The extension of pistons 144 and 152 serves to rotate cranks 145 and 153 on crankshafts 146 and 150 so as to swing crimping bar assemblies 92 and 91 inwardly against the opposite sides of the top 19a of the bag, to a closed position as shown in FIG. 7. It should be noted that the bag sealing position of the crimping bars 91 and 92 as shown in FIG. 7, is above the forming bar assemblies 93 and 94. By virtue of this arrangement, the full weight of the bag is held by forming bar assemblies 93 and 94, engaged as shown in FIGS. 5–8 in a tongue-in-groove arrangement. Thus, there is no downward weight acting on crimping bar assemblies 91 and 92 which might otherwise cause the bag mouth to tear during the sealing operation. The closing movement of crimping bar assemblies 91 and 92 is initiated upon a predetermined downward travel of bag sealing apparatus 90.

As the bag top 19a is grasped firmly between the crimping bars 117, 124, the crimping projections formed in the respective faces 139, 140 of the bars act to form the transverse crease C across the bag top 19a, thereby partially folding the bag top 19a over in a predetermined direction. The partial folding of the bag top 19a brings the pre-applied heat sensitive adhesive 157 on the bag top adjacent to a heater 158 mounted on the crimping bar 117 as illustrated in FIGS. 5–10.

After a predetermined dwell time sufficient for the heater 158 to have activated the heat sensitive adhesive 157 has elapsed, cylinder 142 is actuated to retract piston 144, thereby opening crimping bar assembly 92 as shown in FIG. 8. Crimping bar assembly 91 remains in its closed position for the sealing of the bag top 19a. When crimping bar assembly 92 has cleared the partially folded bag top, cylinders 163 are actuated to extend pistons 164, thereby rotating platen 159 into contact with the bag top 19a as shown in FIG. 10. In its downward rotation, platen 159 causes the bag top to fold over at the transverse crease C such that the heat sensitive adhesive 157 contacts the side wall of the bag 19. Platen 159 urges the folded bag top into contact with a plurality of rollers 166 which are then reciprocated against platen 159 to ensure that adhesive 157 has securely sealed the top of the bag 19.

After a predetermined dwell time sufficient for the action of the rollers 166 against the elastomeric pad 170 of the platen 159 to have securely sealed the bag top, cylinders 163 are actuated to rotate the platen 159 away from the bag top 19a. When the bag top 19a has been released by the platen 159, cylinder 149 is actuated to retract piston 152, thereby pivoting crimping bar assembly 91 away from the bag 19 to its open position as illustrated in FIG. 6. This will normally be accomplished before bag sealing apparatus 90 reaches the lower extremity of its travel. When bag sealing apparatus 90 does reach that lowermost, rest position as shown in FIG. 2, drive motor 105 is deactivated and cylinder 133 is actuated to retract its piston 135. With this operation, forming bar assemblies 93 and 94 are swung to their open positions and a filled and sealed bag 19 is released to drop down onto conveyor 171. Successively dropped, filled bags 19 are carried away by conveyor 171 as illustrated in FIGS. 1 and 2. After a filled bag 19 has been deposited on conveyor 171, with bag sealing apparatus 90 at the bottom of its travel path as shown in FIG. 2, the bag sealing apparatus 90 is ready to move up to clamp and seal the next bag.

Where plastic bags are to be clamped and sealed by the bag sealing apparatus 90, one or both of the crimping bar assemblies 91, 92 may be provided with heat sealing elements 156. In this case, the crimping bar assemblies 91, 92 would close on the top of a plastic bag 19 and the heat sealing element(s) 156 would be activated to seal the top of the bag 19 closed as shown in FIG. 7. There would be no need to actually fold the top of a sealed plastic bag 19 over utilizing the fold-over arm 141. After a predetermined dwell time had elapsed, the heat sealing element(s) 144 would be de-energized, and a fraction of a second cooling time would be allowed. It is noteworthy that the sealing of the bag mouth and the subsequent cooling of the crimping bars 117 and 124 in this application would take place very rapidly during the downward travel of the bag sealing apparatus 90. Sealed, filled plastic bags 19 would be deposited on the conveyor 171 by the bag sealing apparatus 90 as indicated above.

Alternatively, a heat sealing element(s) 156 could be utilized in conjunction with the sealing of paper bags 19 having plastic liners. In this instance the heat sealing element(s) 156 would be activated to seal the plastic liner when the crimping bar assemblies 91, 92 have been pivoted to their closed positions to crease and partially fold the top of the bag 19. What is more, heat sealing element(s) 156 may be provided on forming bars 123, 128 for the purpose of sealing plastic liners of paper bags.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A bag sealing apparatus comprising:
    a pair of opposable forming bars and a pair of independently actuable and opposable sealing bars,
    said forming and sealing bars being disposed between a pair of parallel mounting plates,
    said forming bars being arranged to clamp the top of a filled bag below said sealing bars;
    a bag folding arm pivotally mounted to a first one of said sealing bars, said bag folding arm capable of folding a bag top over into contact with a side of said bag; and,
    wherein said pair of sealing bars include a bag crimping structure arranged and constructed to form a crimp in said top of said filled bag so as to bias said top of said filled bag in a desired fold direction.

2. The bag sealing apparatus of claim 1 wherein said bag crimping structure of said sealing bars further comprises:
    respective forming surfaces formed in the opposable faces of the sealing bars, said forming surfaces being arranged to clamp said bag top therebetween and further arranged to form a crimp in said bag top to bias said bag top in a desired fold direction.

3. The bag sealing apparatus of claim 2 wherein at least one of said respective forming surfaces of said sealing bars further comprises:
    a heating element for heating said bag top at the point of contact between said forming surfaces and said bag top.

4. The bag sealing apparatus of claim 1 further comprising a heating element secured to one of said sealing bars so as to activate a heat sensitive adhesive applied to a bag side.

5. The bag sealing apparatus of claim 4 wherein said folding arm folds said bag top into contact with said activated heat sensitive adhesive to seal said bag top.

6. The bag sealing apparatus of claim 1 wherein said first of said sealing bars has secured thereto a compression plate, said compression plate being located upon said first sealing bar so as to oppose pressure exerted on said top of said bag by said fold over arm when said fold over arm has been actuated to fold said top of said bag over into contact with said side of said bag.

7. The bag sealing apparatus of claim 6 wherein said compression plate further comprises a plurality of compression rollers, said rollers being arranged to be reciprocated laterally with respect to the fold over arm when said fold over arm has been actuated to fold said bag top over into contact with said bag side.

8. A bag sealing apparatus comprising:
    a pair of opposable forming bars and a pair of opposable sealing bars, the pair of sealing bars being actuable independent of one another, at least one of said sealing bars having Pivotally mounted thereabout a bag folding arm, said bag folding arm capable of folding a bag top over into contact with a side of said bag;
    said forming and sealing bars being disposed between a pair of parallel mounting plates;
    said forming bars being arranged to clamp the top of a filled bag below said sealing bars; and,
    a bag crimping structure arranged and constructed to form a crimp in said top of said filled bag so as to bias said top of said filled bag in a desired fold direction.

9. The bag sealing apparatus of claim 8 wherein said bag crimping structure of said sealing bars further comprises:
    respective forming surfaces secured to the respective sealing bars, said forming surfaces having complementary opposable faces arranged to clamp said bag top therebetween and further arranged to form a crimp is said bag top to bias said bag top in a desired fold direction.

10. The bag sealing apparatus of claim 9 wherein at least one of said respective forming surfaces of said sealing bars further comprises:
    a heating element for heating said bag top at the point of contact between said forming surfaces and said bag top.

11. The bag sealing apparatus of claim 10 wherein said heating element activates a heat sensitive adhesive on said bag top.

12. The bag sealing apparatus of claim 11 wherein said folding arm folds said bag top into contact with said activated heat sensitive adhesive to seal said bag top.

13. An apparatus for filling and sealing bags comprising:
- a material dispensing spout having a discharge end defined by closure members operable between closed and open positions for discharging particulate material into a bag;
- a first power actuator positioned and arranged to open and close the spout discharge end closure members;
- clamping members on the spout discharge end movable between a closed position in clamping engagement with a bag mouth on the spout discharge end and an open position;
- a carriage movable in a travel path between a first, bag receiving position in close proximity to the spout discharge end and a second, bag discharge position away from the spout;
- sealing apparatus mounted on the carriage and movable between a first, inoperative position and a second position in sealing juxtaposition with a bag mouth, whereby bags may be clamped on the spout and filled one at a time, and thereafter released by the spout clamping members for sealing by the sealing apparatus and movement by the carriage to a release position and wherein the sealing apparatus comprises:
- a pair of opposed forming bars;
- a pair of sealing bars independently actuable with respect to each other;
- said forming and sealing bars being disposed between a pair of parallel mounting plates;
- said forming bars being arranged to clamp the top of a filled bag below said sealing bars.

14. The apparatus for filling and sealing bags of claim 13 further comprising:
- a slip tube suspended in substantially vertical alignment with the spout and vertically moveable between a first, bag filling position in which the slip tube extends through the spout discharge end and into a bag to be filled when the spout is open and a second, inoperative position in which the slip tube is retracted vertically and the spout is closed.

15. The apparatus for filling and sealing bags of claim 14 further comprising:
- a nozzle disposed within said slip tube, said nozzle being connected to a pump for evacuating air from the headspace of the bag being filled immediately prior to the closing of the material dispensing spout.

* * * * *